United States Patent [19]

Muraoka et al.

[11] 4,155,106
[45] May 15, 1979

[54] MAGNETIC HEAD USING A SEMICONDUCTOR ELEMENT

[75] Inventors: Hiroshi Muraoka; Teruo Tohma, both of Tokyo, Japan

[73] Assignee: Pioneer Electronic Corporation, Tokyo, Japan

[21] Appl. No.: 316,153

[22] Filed: Dec. 18, 1972

[30] Foreign Application Priority Data

Jan. 1, 1972 [JP] Japan .................................. 47/1722

[51] Int. Cl.² .......................... G11B 5/38; G11B 5/22; G11B 5/42; B24B 1/00
[52] U.S. Cl. ................................. 360/112; 360/122; 29/603; 51/165.77; 51/281 R
[58] Field of Search ............. 179/100.2 CH, 100.2 C; 29/603; 51/165.75, 165.77, 281 R; 360/110, 122, 112

[56] References Cited

U.S. PATENT DOCUMENTS

| 3,597,888 | 8/1971 | Kusakabe et al. ................ 51/165.77 |
| 3,699,720 | 10/1972 | Lenning ........................... 51/165.77 |
| 3,775,910 | 12/1973 | Kubo ................................ 51/165.77 |
| 3,787,638 | 1/1974 | Masayuki .................... 179/100.2 CH |
| 3,821,815 | 6/1974 | Abbott et al. ...................... 360/110 |

Primary Examiner—Robert S. Topper
Attorney, Agent, or Firm—Sughrue, Rothwell, Mion, Zinn and Macpeak

[57] ABSTRACT

A magnetic head having one or more magneto-electric converting elements, such as Hall elements, and comprising plural leads which are used, when the magnetic head is manufactured, for measuring the amount of head material ground away between a front surface of the magnetic head and the front edge of the magneto-electric converting element in order to control a two-stage grinding operation on the head.

8 Claims, 5 Drawing Figures

MAGNETIC HEAD USING A SEMICONDUCTOR ELEMENT

BACKGROUND OF THE INVENTION

1. Field of the Invention

The present invention relates generally to a magnetic head for use with magnetic reproducing equipment. More particularly, the magnetic head has a plurality of magneto-electric converting elements, for example, Hall elements, in a film form and a plurality of leads or terminals for providing electrical connections to an external circuit. The head also includes plural leads or terminals for use during the manufacturing process.

2. Description of the Prior Art

In the manufacturing of prior art magnetic heads of the ring core type, which is the most popular type, the front surface of the magnetic head is ground while the impedance of the head coil is measured, and the amount of head material ground off or removed is indicated by the measured impedance value. However, this method cannot be adapted to the manufacturing of a magnetic module head including semiconductor elements, such as Hall elements for example, instead of coils. In the manufacturing of such a semiconductor-type module head, the front surface of the magnetic head must be ground while the amount of material being removed is being measured, and the amount of material to be ground off is determined by the distance between the front edge of a substrate and the front edge of the semiconductor element formed on the substrate.

In the prior mass production processes for semiconductor-type heads, each substrate which comprises one half of the final head construction is manufactured to be of uniform size. One or more magneto-electric converting elements are uniformly formed in film form by vacuum deposition onto each substrate. The electric leads for the elements are formed onto each substrate by evaporating a metal thereon. One or more magnetic circuit elements, for example, a plurality of ferrite tips which will comprise the other half of the head constructions, are attached firmly to each substrate to correspond with each element; and by these steps, the fundamental construction of a head is accomplished. Then the front surface of the head must be ground to a pre-designed uniform size. However, the distances between the front surface of the head and the front edges of each of the elements are not always identical. Consequently, heads manufactured in the manner described have uneven characteristics relative to each other; that is, the reproducibility factor of the prior art process for producing a plurality of uniform heads is low.

In another advanced prior art mass production process for semiconductor-type heads as disclosed in U.S. Pat. No. 3,787,638, one or more detector leads are provided which are used when the magnetic head is manufactured for measuring the amount of head material ground away from between a front surface of the magnetic head and the front edge of the magneto-electric converting element. According to this process, many improvements over the above mentioned prior art can be obtained; for example, by measuring the resistance of the detector leads, the grinding process becomes simple, and magnetic heads of the same characteristic are easily reproduced in large quantities. Namely, the front surface of the magnetic head is ground until the detector lead is ground away and electrically separated, whereby the amount of grinding can be accurately controlled. However, the grinding speed must be constant and low because it cannot be predicted when the detector lead will be electrically cut away. This raises problems when it is necessary to grind a large amount. Therefore, the time required for grinding becomes extremely long. If the grinding is done speedily, the material being ground which is usually composed of ferrite is chipped and the front surface of the magnetic head becomes coarse.

SUMMARY OF THE INVENTION

It is therefore an object of the present invention to provide a novel and improved magnetic head wherein the dimensions between the front surface and the magneto-electric converting element are accurately determined.

It is a further object of the present invention to provide a novel and improved magnetic head which can be completed in a relatively short time period.

It is still a further object of the present invention to provide a novel and improved magnetic head wherein plural detector leads are provided without many outward terminals for use during the manufacturing process.

BRIEF DESCRIPTION OF THE DRAWINGS

Other objects, features and advantages of the present invention will become apparent from the following description taken in conjunction with the drawings in which.

DESCRIPTION OF THE PREFERRED EMBODIMENT

Referring to FIGS. 1 to 3 and 5 as one embodiment of the present invention, a two channel magnetic head, including two Hall elements, will be explained in detail.

Figure 1:
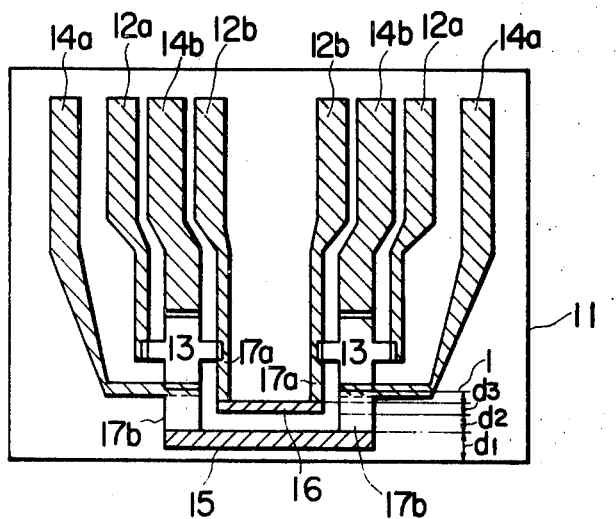
FIG. 1 is a plan view of a first embodiment of a substrate on which two Hall elements and leads are vacuum deposited.
Figure 2:
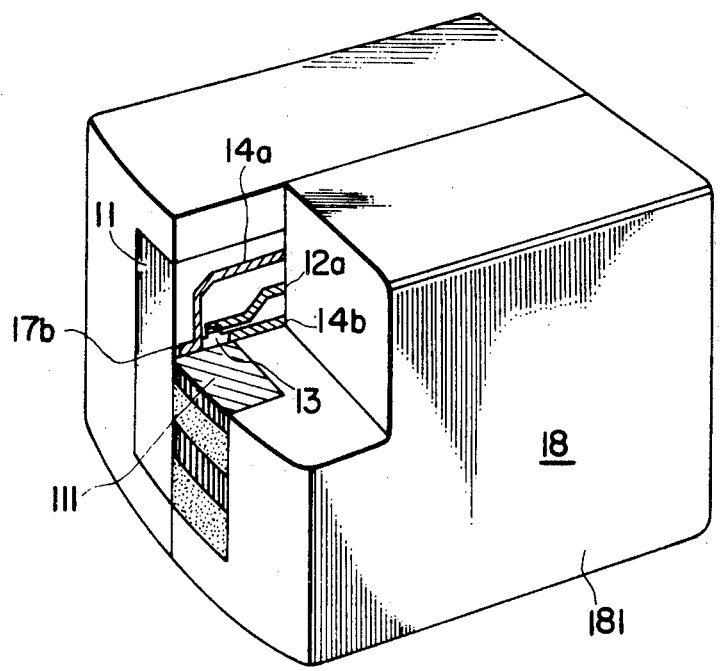
FIG. 2 is a partially cut-away perspective view of the embodiment illustrated in FIG. 1.

In FIG. 1, two Hall elements 13 of indium antimonide (In Sb) are formed in film form, on a substrate made of highly permeable magnetic materials such as a ferrite substrate 11, by vacuum deposition using an evaporation-mask (not shown). Then, electroconductive materials (or electroresistive materials) are deposited on the substrate 11 in a well known manner to form ground leads 14a for the Hall elements, Hall voltage leads 14b, and control current leads 12a and 12b. Further, first detector leads 15, second detector leads 16, and connector leads 17a and 17b are also formed. The distance dimension 1 between the Hall elements 13 and the front part of the magnetic head, that is the part adjacent a magnetic tape, is accurately determined by utilizing the distance dimension between the Hall elements 13 and the second detector leads 16. Finally, ferrite tips 111 are affixed to the ferrite substrate 11 to hold Hall elements 13 in each magnetic circuit, and then they are assembled in a head module 181 as shown in FIG. 2. Now, the first detector leads 15 are connected with the second detector leads 16 by and through Hall elements 13 and conductor leads 17a and 17b. The first and second detector leads 15 and 16 and also connected to ground leads 14a.

Figure 3:
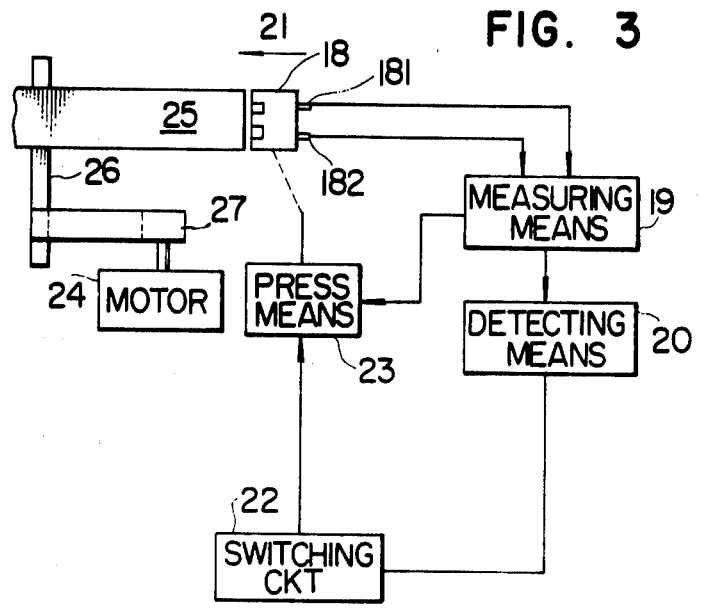
FIG. 3 is a block diagram of a grinding apparatus for grinding the front surface of a magnetic head.

Referring now to FIG. 3, one ground lead 14a shown in FIG. 1 is connected to a terminal 183 of the magnetic head 18, and the other ground 14a is, in the same manner, connected to a terminal 182. Both terminals 183 and 182 are connected to a measuring means 19. The measuring means 19 is connected to an input of a detecting means 20 which has its output connected to a switching circuit 22.

Then, operation of a grinding device including the above control means will now be described with reference to FIG. 5 which shows the variation of resistance of the first and second detector leads 15 and 16.

The magnetic head 18 is contacted by a grinder 25, and the head is continuously pushed by a press means 23 in the direction indicated by an arrow 21. The front surface of the magnetic head 18 is ground by the grinder 25 which is rotated by a motor M through a belt 24. Before the front of the magnetic head 18 is ground down to d1, the measuring circuit comprises ground leads 14a, Hall elements 13 and connector leads 17a, 17b, and lead 15. Consequently, the first detector lead 15 is not ground at beginning of the grinding operation, and only the ferrite substrate 11 is ground. Therefore, there is no resistance variation between the two terminals 183 and 182.

Figure 5:
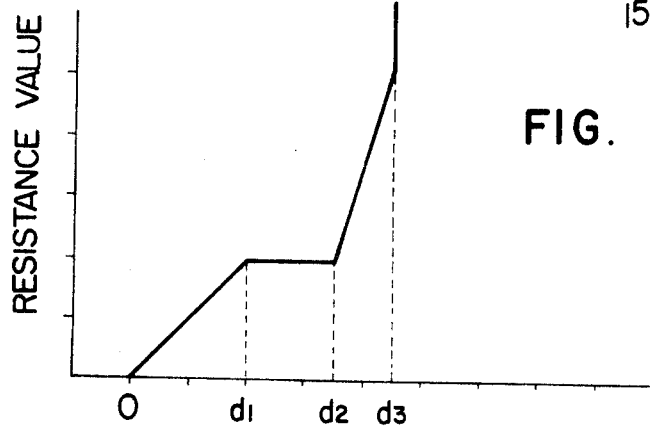
FIG. 5 is a graph showing the variation of resistance value of detector leads versus grinding amount of the embodiment illustrated in FIG. 1.

As grinding continues, the first detector lead 15 begins to be ground and resistance value increases during the grinding period 0–d1 as shown in FIG. 5. When the head 18 is ground down to d1, the first detector lead 15 is ground away. Therefore, the measuring circuit changes to the circuit composed by ground leads 14a, Hall elements 13, connector leads 17a and the second detector lead 16. The resistance value does not change during the grinding period d1–d2. Measuring means 19 measures a constant resistance which is detected by detecting means 20 which sends a signal to the switching circuit 22. Switching circuit 22 changes the grinding speed to another speed for a finishing, and the pressure of the press means 23 is reduced.

After the grinding period d1–d2, grinding of the second detector lead 16 is started and the resistance value increases rapidly during the grinding period d2–d3. When the second detector lead 16 is ground away, the resistance value becomes infinite. The measuring means 19 measures the changes in resistance, and through detecting means 20 and switch circuit 22 the press means 23 is released, and the grinding operation is terminated.

Figure 4:
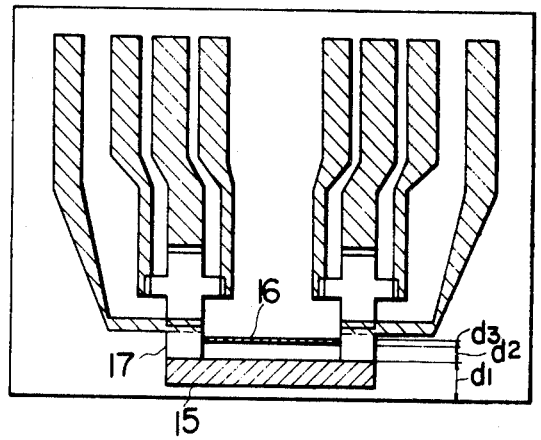
FIG. 4 is a plan view of a second embodiment of the substrate according to the present invention.

Referring now to FIG. 4, an alternate embodiment of the present invention is shown, in which the first and second detector leads 15 and 16 are connected with the connector leads 17. The current for measurement therefore does not run through the Hall elements and the elements are protected from damage.

According to this invention, as hereinbefore described, many improvements over the prior art can be obtained. First, the time for grinding can be shortened and the finishing of grinding can be well controlled. Second, plural detector leads are connected by connector leads; thereby terminals of the magnetic head can be diminished. Third, the grinding speed can be accurately changed. Fourth, the manufacturing process is excellent for mass production, and the improved head is inexpensive to manufacture.

While the invention has been particularly shown and described with reference to the preferred embodiments thereof, it will be understood by those skilled in the art that various changes in form and details may be made therein without departing from the spirit and scope of the invention.

We claim:

1. The process of forming a magnetic head by subtractively machining one surface of a nonconductive substrate carrying a number of magnetic and conductive layers, at least one layer including first and second portions electrically connectable through leads to external monitoring apparatus, comprising the steps of:
   first, machining the head at a first rate while monitoring the electrical current through the first portion;
   second, terminating machining at the first rate when electrical current no longer flows through the first portion;
   third, machining the head at a second rate, slower than the first rate while monitoring the electrical current through the second portion; and
   fourth, terminating machining when electrical current through the second portion substantially equals a predetermined value.

2. A magnetic head subassembly including materials intended for removal during manufacture of a complete head, comprising:
   a plurality of conductive elements arranged substantially along one side of a line defining a head surface, portions extending across the line being removed during manufacture;
   a plurality of conductive bridges to be removed during manufacture, arranged along the other side of aforesaid line, connected with the conductive elements at selected points of said portions extending across said line; and
   connectors, for providing electrical connections to all the elements and bridges, solely through the element.

3. The subassembly of claim 2 wherein each element is connected to at least one bridge.

4. A magnetic head which is ground during the manufacturing process by an apparatus including a two-speed grinder and grinder speed-switching means, said head comprising: at least one substrate, at least one magneto-electric converting element deposited on said substrate, necessary operating leads on the substrate and connected to said element, first and second detector lead means on the substrate for switching the grinding speed from a high grinding speed to a lower finishing grinding speed and for terminating the grinding operation, said first and second detector lead means being adapted to be electrically coupled to said speed switching means during the grinding operation, said first detector lead means being disposed near the front surface of said head, said second detector lead means being disposed inwardly of said first detector lead means and near said magneto-electric converting element for determining the distance between said element and the finished front surface of the head, so that, when said first detector lead means is ground away, the grinder switches from said high grinding speed to said finishing speed; and, when said second detector lead means is ground away, the grinding operation is terminated.

5. A magnetic head as set forth in claim 4 wherein said at least one substrate is made of a highly permeable magnetic material.

6. A magnetic head as defined in claim 4 wherein said magneto-electric converting means is a Hall element.

7. A magnetic head as defined in claim 4 wherein resistance measured across said lead means changes as said detector lead means are ground away.

8. A system for controlling the grinding of the front surface of a magnetic head including a magneto-electric converting element, and two detector leads connected in circuit with the terminals of said head and spaced apart in the direction of grinding, said system comprising:

(a) measuring means connected to said terminals for measuring the resistance therebetween;

(b) detecting means connected to said measuring means for detecting the output thereof;

(c) grinder means for grinding the front surface of said head; and (d) switch means connected to said detecting means for detecting the output thereof and for controlling said grinder means so that said grinder means operates at a first speed during the grinding of one of said detector leads, operates at a second speed after the grinding away of said one lead, and is rendered inoperative after the grinding away of the other lead, whereby the grinding of said leads changes the resistance measured between said terminals.

* * * * *